Nov. 10, 1953     J. P. EMSHWILLER     2,658,550
MECHANISM FOR INTERLOCKING PILE TUBES TO SUBMERGED
STRUCTURES FROM ABOVE THE SURFACE
Filed May 5, 1950
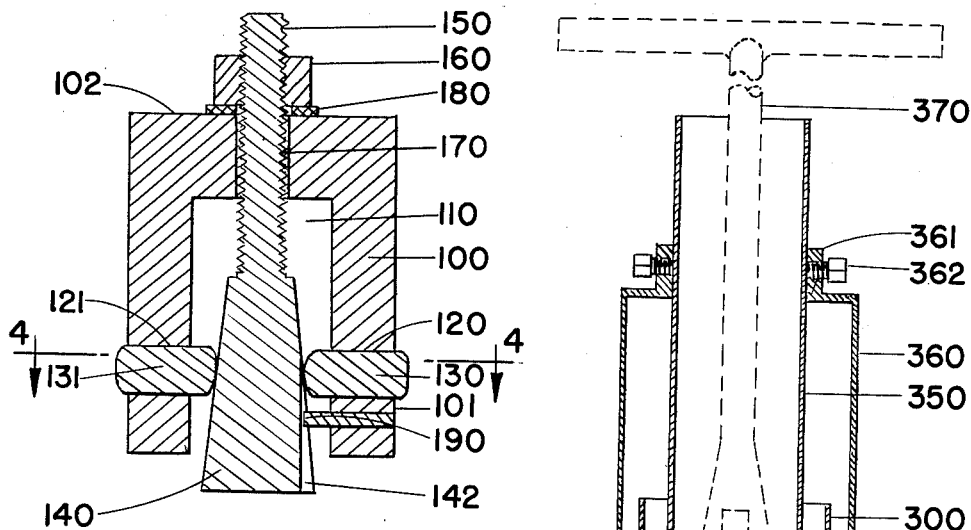
FIG. 1
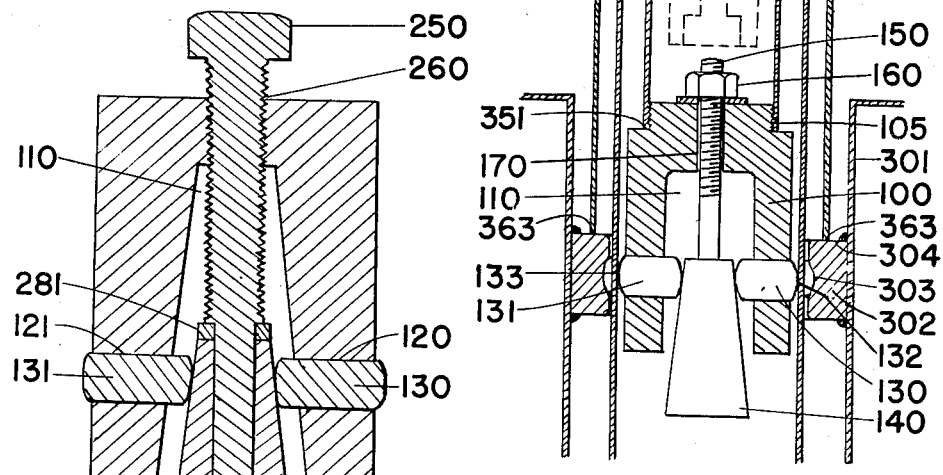
FIG. 2
FIG. 3
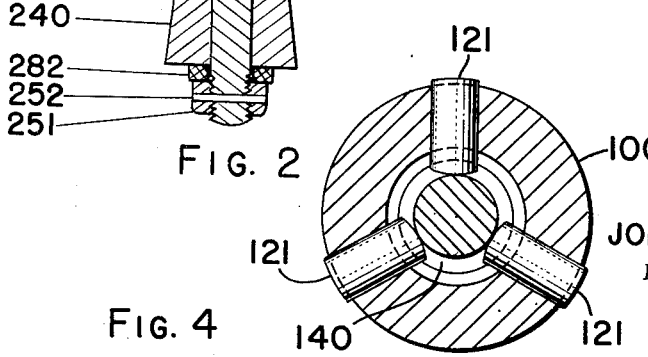
FIG. 4
INVENTOR.
JOHN P. EMSHWILLER
BY
*Roy C. Hackley Jr.*
ATTORNEY

UNITED STATES PATENT OFFICE 2,658,550

MECHANISM FOR INTERLOCKING PILE TUBES TO SUBMERGED STRUCTURES FROM ABOVE THE SURFACE

John P. Emshwiller, Riverdale, Md.

Application May 5, 1950, Serial No. 160,201

1 Claim. (Cl. 153—80)

(Granted under Title 35, U. S. Code (1952), sec. 266)

The invention described herein may be manufactured and used by or for the Government of the United States for governmental purposes without payment to me of any royalty thereon in accordance with the provisions of the Act of April 30, 1928 (ch. 460, 45 Stat. L. 467).

This invention relates to a tool for deforming the walls of tubing.

It is an object of this invention to provide a tool which is particularly adapted for interlocking piling as described in my co-pending application Serial No. 160,203, filed May 5, 1950. The tool, however, will be useful in other instances where it is desired to expand, perforate, or deform the walls of tubing at any particular point.

Other objects and advantages will be apparent or will appear hereinafter.

These objects and advantages are accomplished in accordance with this invention by means of a tool for deforming tubing which comprises an internally recessed body section insertable in the tubing to be deformed, a plurality of openings about the periphery of said body section leading to said recess, movable plungers in said openings which are greater in length than the wall thickness of the body section from periphery to recess, within said body section recess a movable wedge member engaging said plungers, and means for moving said wedge member within said recess in a manner that will displace said plungers in an outwardly direction relative to said body section.

For purposes of this application the term tubing is used in a broad sense and includes tubes, pipes, and similar tubular conduits regardless of cross-sectional shape. For simplicity of description the tubing specifically referred to herein can be assumed to be of circular cross section; the invention however is not to be construed as limited thereto.

Figures 1 and 2 show cross sectional views of two presently preferred embodiments of this invention and Figure 3 illustrates the use of the tool embodied in Figure 1 while Fig. 4 is a horizontal cross section at the level of the line 4—4 in Fig. 1, of a preferred form of the tool of the invention.

Referring now to Figure 1, there is shown a body section 100 which is internally recessed 110. A plurality of holes 120 and 121 pass through the body section from its periphery 101 to the recess 110. These holes may be of any convenient number, shape, size and location necessary to accomplish the desired deformation; here however for simplicity they are preferably round as shown in Fig. 4. In each of these holes there are plungers 130 and 131. The plungers too may vary in number, shape, size, and location as necessary for the particular application, however the length of the plungers must be greater than the wall thickness of the body section as may be readily seen in the drawings. While the number of peripheral holes and plungers may be varied as desired, it is generally preferred to employ three plungers as shown in Fig. 4, because of the advantages of equal loading of each plunger and the self-centering and alignment which may be obtained thereby. The portions of the plungers within the body section recess are engaged by wedge member 140, which can be moved within the body recess by means of the threaded stem 150 and the nut 160; generally in a plane substantially perpendicular to the plane of plunger movement. A threaded stem 150 is secured to the wedge 140 and extends through a hole 170 in the end of the body section 102 and the nut 160 engages the threads of the stem and acts against the end of the body section 102. A washer or similar anti-friction member 180, may if desired be interposed between the nut and the end of the body section. Turning nut 160 will cause the wedge 140 to move in the body section recess 110. It is presently preferred to employ some means such as the key 190 in the body and the slot 142 in the wedge to prevent rotation of the wedge member.

Figure 2 shows a variation of the invention. In this modification the body section 100, recess 110, holes 120 and 121, pins 130 and 131 are as shown and described for the corresponding elements under Figure 1. However, in this embodiment the wedge member 240 is moved within the recess by means of bolt 250 and the thread portion of the end of the body section 260. As shown in this particular embodiment the bolt 250 passes through a hole 241 in the wedge member 240. The wedge is secured to the bolt by means of a nut 251 or similar anchoring means of such design that it will not become loosened due to the turning of the bolt. This may be accomplished in many ways known to the art such as using a keyed nut 252 as shown in the drawing, lock nuts, and the like. Anti-friction washers or bearings may be interposed between the bolt and wedge member at 281 and 282 if desired.

The use and operation of the tool may be understood by reference to Figure 3 and also my copending application Serial No. 160,203, filed May 5, 1950. Figure 3 shows the use of the tool to deform tube 300 and to effect an interlock between tube 300 and structure 301. In the particular embodiment shown in Figure 3 tube 350 is employed as an extension member to permit insertion and manipulation of the tool within tube 300, however, the extension member may take any appropriate form. Tube 350 is threaded at its end 351 to permit attaching and detaching the extension member from the tool proper which has a corresponding set of threads at 105. In connection with the extension member 350 there are means for limiting the extent of insertion of the tool within tube 300 so as to properly align the tool plungers at the point where deformation or interlocking is desired. A particularly satisfactory means for carrying out this operation is shown in Figure 3 as the adjustable sleeve which includes a close fitting collar 361 about tube 350, set screws 362, and the sleeve 360. The sleeve 360 is of sufficient diameter so that it can pass over tube 300. The lower ends of the sleeve 363 limit the extent of inserting the tool by their engagement with portions of structure 301 which are a known distance from the desired point of interlock; for example, shoulder 304. By sliding collar 361 along the length of tube 350 it is possible to adjust the distance between the sleeve end 363 and the plunger pins 130 and 131 so that the interlock or deformation of tube 300 will be made at the desired point.

As part of the structure to be interlocked with tube 300, there is a rigid reinforcing ring 302 which has an undercut, grooved, or similarly deformed portion 303. The outer ends of the tool plungers 132 and 133 may, if desired, be constructed to conform with the deformity of the ring 303. Since the distance from the ring shoulder 304 to the deformity 303 is known it is possible to align the plungers with the deformity by sliding collar 361 along tube 350 until the distance from the sleeve end 363 and the center of the plungers 130 and 131 are equal to the distance from shoulder 304 to the center of the deformity 303. The sleeve is then immobilized by means of set screws 362. Then when the tool is inserted into tube 300 to the point when the sleeve ends 363 are engaged by the shoulder 304 the plungers and the conforming deformity of the ring 303 will be properly aligned. During the insertion of the tool the wedge member 140 should be so positioned that the plungers 130 and 131 are in a retracted position within the tool body section recess 110. After the plungers have been aligned the nut 160 can be turned by means of a wrench 370 to cause the plungers to be extended against the inner wall of tube 300. Because of the great mechanical advantage that results from the use of the two inclined planes (the screw and the wedge), the resulting pressure which can be placed on the tube 300 will cause it to deform about the plunger and match up with the deformity in the ring 303 thereby effecting the interlock. The tool may be left in position or it may be removed after completing the interlock. When it is desired to recover the tool this can be done by loosening up nut 160, freeing wedge member 140, and then removing the entire assembly.

When it is merely desired to deform a tube at some particular point along its length, the collar 361 alone can be employed to positively limit the extent of insertion of the tool by its adjustability along the extension member and by its engagement with the tube end.

From the foregoing description and drawings it is apparent that a new and useful tool for deforming tubing and interlocking tubing with other structures has been presented.

Since many widely differing embodiments of the invention will occur to one skilled in the art, the invention is not limited to the specific details illustrated and described, and various changes can be made therein without departing from the spirit and scope thereof.

What is claimed is:

A tool for deforming tubing walls of given diameter into interlocking relation with an external structure at a considerable and variable distance remote from their ends, said tool comprising an expanding unit including a relatively short internally recessed body sized for bodily insertion into the tubing to the depth at which it is to be deformed and comprising laterally movable expanders and means for moving the same; an extension unit detachably secured to said recessed body, said extension unit being sized for insertion into the tubing behind the expanding unit and being of a length to project outwardly from the end of said tubing when the expanding unit is in place therein at such considerable distance from the end thereof; a positioning unit comprising a collar adjustable on the outer end of said extension unit remote from said expanding unit and an outer sleeve carried by said collar and sized to extend externally about the tubing to be deformed and to engage the external structure approximately at the location at which the expansion is to be effected at a position remote from the tubing ends, adjustment of said collar relative to said extension unit serving to position the expanding unit in the tubing in proper relation to the external structure regardless of variation in the distance thereof from the end of the tubing; the expander moving means of the expanding unit being a wrench operable means extending into the internally recessed body and mounted thereon at approximately the level of securement of the extension unit thereto, and the extension unit being tubular and thus providing for the insertion and approximate guidance of an elongated socket wrench therethrough for engaging and operating said expander moving means; the separateness of the wrench operable means from such wrench and the separability of the extension enabling the expander unit to be left in place deep in the tubing where it is protected from tampering or to be removed therefrom after the expansion is accomplished.

JOHN P. EMSHWILLER.

References Cited in the file of this patent
UNITED STATES PATENTS

| Number | Name | Date |
|--------|------|------|
| 854,242 | Scott | May 21, 1907 |
| 937,526 | Hawkins | Oct. 19, 1909 |
| 2,362,350 | Buck | Nov. 7, 1944 |

FOREIGN PATENTS

| Number | Country | Date |
|--------|---------|------|
| 603,885 | Great Britain | June 24, 1948 |